(12) United States Patent
Ogura

(10) Patent No.: US 7,321,208 B2
(45) Date of Patent: Jan. 22, 2008

(54) DRIVING APPARATUS

(75) Inventor: Mitsuo Ogura, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 11/430,026

(22) Filed: May 9, 2006

(65) Prior Publication Data

US 2006/0283668 A1   Dec. 21, 2006

(30) Foreign Application Priority Data

Jun. 20, 2005   (JP) .............................. 2005-179455

(51) Int. Cl.
*F16H 33/06* (2006.01)
*F03G 1/00* (2006.01)

(52) U.S. Cl. ................... 318/1; 318/484; 185/40 B; 267/156

(58) Field of Classification Search ............... 318/1, 318/9, 14, 15, 466–468, 484; 388/921; 185/9–11, 185/37, 39, 40 R, 40 B; 267/154–156
See application file for complete search history.

(56) References Cited

U.S. PATENT DOCUMENTS

| | | | | |
|---|---|---|---|---|
| 4,428,248 A | * | 1/1984 | Broucksou et al. | ........... 74/335 |
| 4,595,081 A | * | 6/1986 | Parsons | ..................... 185/40 R |
| 4,677,355 A | * | 6/1987 | Baumann | ..................... 318/160 |
| 4,741,508 A | * | 5/1988 | Fukamachi | .................. 251/71 |
| 5,092,432 A | * | 3/1992 | Taig | ........................... 188/72.3 |
| 5,180,959 A | * | 1/1993 | Christopher | ................ 318/626 |

FOREIGN PATENT DOCUMENTS

| | | |
|---|---|---|
| JP | U-H05-74999 | 10/1993 |
| JP | A-H10-159439 | 6/1998 |
| JP | A-2001-164827 | 6/2001 |
| JP | A-2003-160000 | 6/2003 |
| JP | A-2005-22629 | 1/2005 |
| JP | A-2003-15999 | 6/2006 |

* cited by examiner

*Primary Examiner*—Bentsu Ro
(74) *Attorney, Agent, or Firm*—Posz Law Group, PLC

(57) ABSTRACT

A driving apparatus for driving a functional body mounted on a vehicle comprises a power supply, an electric motor, and a driving means. The electric motor is connected to the power supply and is started by a power feed from the power supply. The driving means has a spring motor and is connected to the electric motor and the functional body. The driving means accumulates an urging force by winding up the spring motor by the electric motor and driving the functional body by the urging force. This driving apparatus can automatically drive the functional body, can be manufactured inexpensively, and accumulates a driving force to the functional body without giving burdens to an occupant.

2 Claims, 3 Drawing Sheets

DRIVING APPARATUS

BACKGROUND OF THE INVENTION

1. Field of the Invention

The present invention relates to a driving apparatus for automatically driving various functional bodies mounted on a vehicle.

2. Description of the Related Art

A driving apparatus mounted on a vehicle for automatically driving various functional bodies conventionally uses an electric motor as a driving source, as disclosed in Japanese Unexamined Patent Publication (KOKAI) Nos. 2003-160,000, 2003-159,999, 2001-164,827, 2005-22,629, and 10-159,439. However, there has been a problem that using the electric motor as the driving source for driving the functional bodies results in the rise of the cost required for the control circuits. Thus, it has been desired to develop a driving apparatus which automatically drives the functional bodies using a driving source other than the electric motor.

On the other hand, for example, Japanese Unexamined Utility Model Publication (KOKAI) No. 5-74,999 discloses a driving apparatus which uses a spring motor (so-called power spring) as a driving source, and drives a functional body by the urging force of the spring motor.

A driving apparatus disclosed in Japanese Unexamined Utility Model Publication (KOKAI) No. 5-74,999 uses a movement in which an occupant manually closes a functional body (a door of a console box) to wind up a spring motor which is connected to a functional body so as to accumulate an urging force in the spring motor. Then, the driving apparatus disclosed in the publication automatically drives the functional body to open by the urging force accumulated in the spring motor.

Meanwhile, the driving apparatus disclosed in Japanese Unexamined Utility Model Publication (KOKAI) No. 5-74, 999 winds up the spring motor by a closing motion of the functional body. Therefore, a load required for closing the functional body increases so that burdens might be imposed on the occupant depending on the shapes of the functional body and the spring motor and so on. Moreover, there has been a problem that the spring motor drives the functional body to open only.

SUMMARY OF THE INVENTION

The present invention has been developed and completed in view of such circumstances. It is therefore an object of the present invention to provide a driving apparatus which can automatically drive a functional body, which can be produced at a low cost, and which accumulates a driving force to the functional body without giving burdens to an occupant.

A driving apparatus according to the present invention can achieve the aforementioned object, and comprises:

a power supply;

an electric motor connected to the power supply, started by a power feed from the power supply; and a driving means having a spring motor, being connected to the electric motor and the functional body, accumulating an urging force by winding up the spring motor by the electric motor and driving the functional body by the urging force.

The present driving apparatus can preferably have one of configurations set forth in (1) to (4) below.

(1) The power supply is turned on and off by a necessary movement of an occupant when the occupant uses the vehicle.

(2) In the above case (1), the power supply is at least one power supply selected from the group consisting of an accessory power supply, an ignition power supply, an illumination power supply, a room lamp power supply, a seat-belt fastening alarm lamp power supply, and a door unlocking power supply.

(3) In the above case (1), the present driving apparatus comprises a cut-off means which is connected to the power supply and the electric motor and cuts the connection between the power supply and the electric motor when the spring motor is wound up by a predetermined number of revolution.

(4) In the above case (3), the cut-off means is a timer which cuts the connection between the power supply and the electric motor when a predetermined period of time elapses after the power supply starts.

In the present driving apparatus, the urging force accumulated in the spring motor drives the functional body. Accordingly, unlike in the case of using an electric motor as a driving source to drive the functional bodies, the cost required for control circuits can be reduced.

Further, since the present driving apparatus accumulates the urging force using the electric motor to wind up the spring motor, the present driving apparatus can automatically drive the functional body both to open and to close. Still further, unlike in the case of winding up the spring motor by the closing movement (or the opening movement) of the functional body, the present driving apparatus does not give burdens to the occupant.

In the present driving apparatus, the power feed starts from the power supply to the electric motor when the power supply is turned on, and the power feed from the power supply to the electric motor stops when the power supply is turned off. Although the power supply can be manually turned ON/OFF, it is preferable that the power supply is automatically turned ON/OFF at a predetermined timing because complicated operations are imposed on the occupant when the occupant manually turns the power supply ON/OFF. In the present driving apparatus having the configuration set forth in (1), the power supply can be automatically turned ON/OFF, thus the present driving apparatus does not give burdens to the occupant. Moreover, since the power supply is turned ON/OFF by a necessary movement of the occupant when the occupant uses the vehicle, it is not necessary to separately provide ON/OFF circuits of the power supply and so on other than the present driving apparatus. Accordingly, the driving apparatus can be produced at a low cost.

In the present driving apparatus having the configuration forth in (2), the power supply is frequently in an on state. Accordingly, the present driving apparatus can wind up the spring motor by the electric motor completely and fully.

In the present driving apparatus having the configuration set forth in (3), when the spring motor is wound up by the predetermined number of revolution, the connection between the power supply and the electric motor is cut and the electric motor stops. Accordingly, the electrical quantity required for driving the electric motor can be reduced.

In the present driving apparatus having the configuration set forth in (4), the connection between the power supply and the electric motor is cut after the electric motor is power-fed for a predetermined time and drives for a predetermined time. Therefore, the spring motor is wound up by the predetermined number of revolution depending on the period of time during which the electric motor has driven. In this instance, such number of revolution of the spring motor is controlled by the timer. Accordingly, since the number of revolution of the spring motor can be controlled by simple structure and circuit, the driving apparatus can be produced at a low cost.

In the present driving apparatus, the necessary movement of the occupant in using the vehicle indicates such actions needed when the occupant gets in and out the vehicle and drives the vehicle.

The necessary movement in getting in and out the vehicle includes actions such as opening or closing a door, sitting on a seat, pulling out a seat belt, and so on. The power supplies turned ON/OFF by opening or closing the door includes the room lamp power supply, the door unlocking power supply, and so on. The power supplies turned ON/OFF by sitting on the seat and pulling out the seat belt include the seat-belt fastening alarm lamp power supply and so on.

The necessary movement for driving the vehicle includes actions such as starting/stopping an engine, turning on a headlight, and so on. The power supplies turned ON/OFF by starting/stopping the engine include the accessory power supply, the ignition power supply, and so on. The power supplies turned ON/OFF by turning on the headlight include the illumination power supply and so on.

In the present driving apparatus, a cover body of an accommodation structure, a height adjusting means of the accommodation structure, a drawer means of the accommodation structure, a cover body of a display structure, a fin of a register, a damper of the register, a seat position adjusting means, and so on can be selected as a functional body.

The accommodation structure includes structures for accommodating an article. For instance, such structures are a console box, a glove box, a beverage holder, and so on. The cover body of the accommodation structure indicates a cover body which opens and closes the accommodation structure. The height adjusting means of the accommodation structure indicates a means for adjusting an internal height of the accommodation structure by raising and lowering a bottom plate of the accommodation structure. The drawer means of the accommodation structure indicates a means for sliding in and out the accommodation structure in a drawer-deployment-type accommodation structure. The display structure includes a monitor and an operation panel of a navigation system, a display panel and an operation panel of an audio system and so on. The seat adjusting means indicates a means for adjusting a position, a height, and an angle of the seat.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which is provided herein for the purpose of illustration only and not intended to limit the scope of the appended claims.

EXAMPLE

Figure 1:
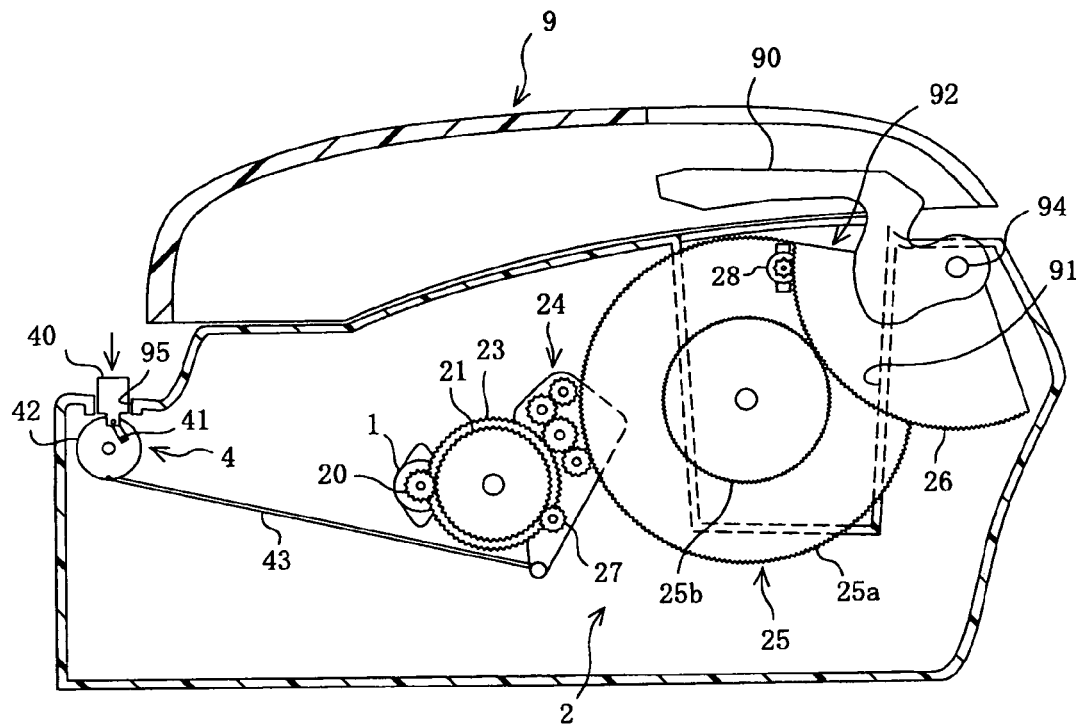
FIG. 1 is a general view for schematically illustrating a driving apparatus according to the Example of the present invention.
Figure 2:
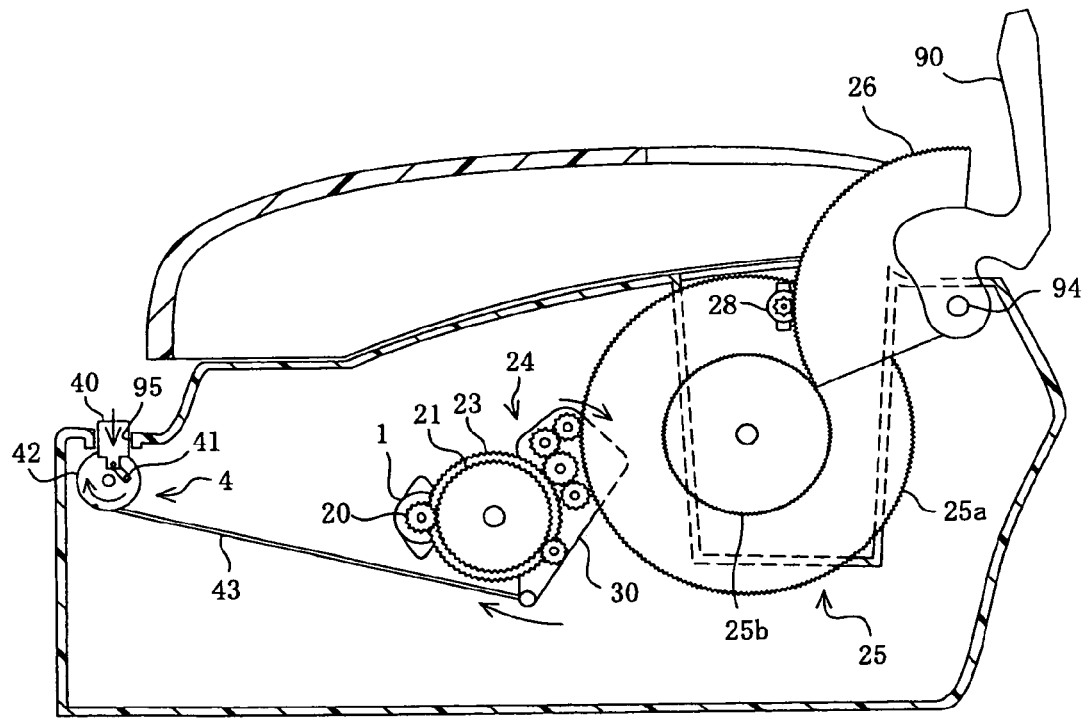
FIG. 2 is a general view for schematically illustrating a driving apparatus according to the Example of the present invention.
Figure 3:
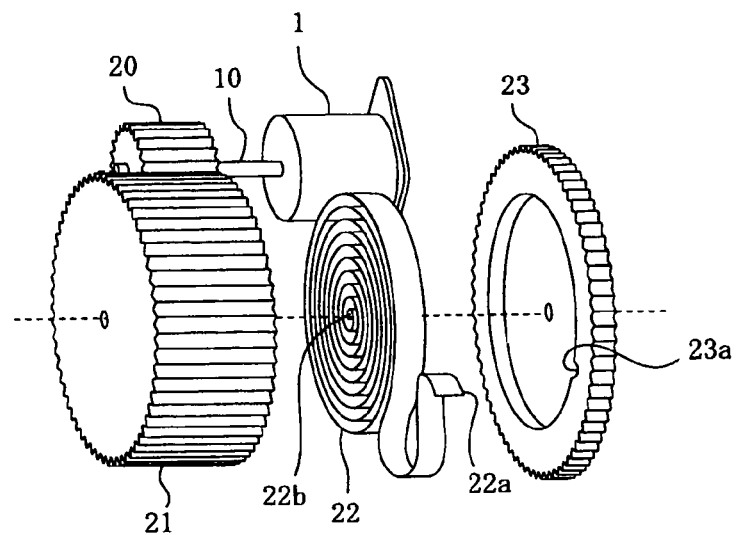
FIG. 3 is an enlarged exploded perspective view for schematically illustrating a major part of a driving apparatus according to the Example of the present invention.
Figure 4:
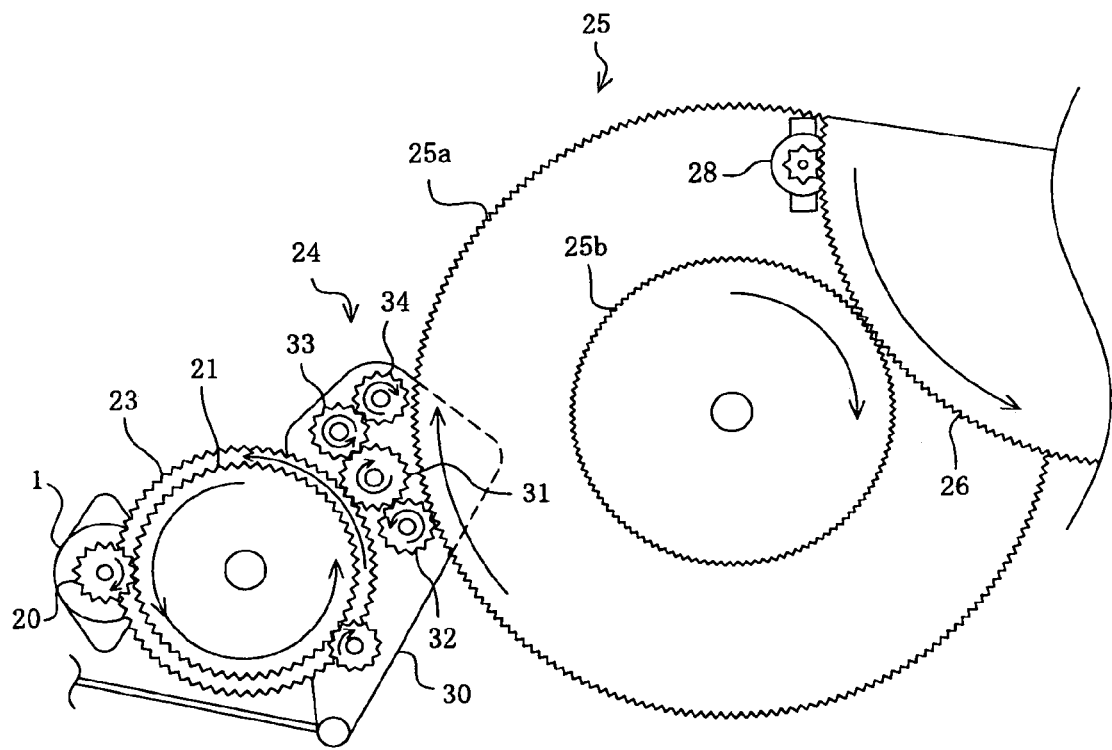
FIG. 4 is an enlarged view showing a major part of the driving apparatus of FIG. 1.
Figure 5:
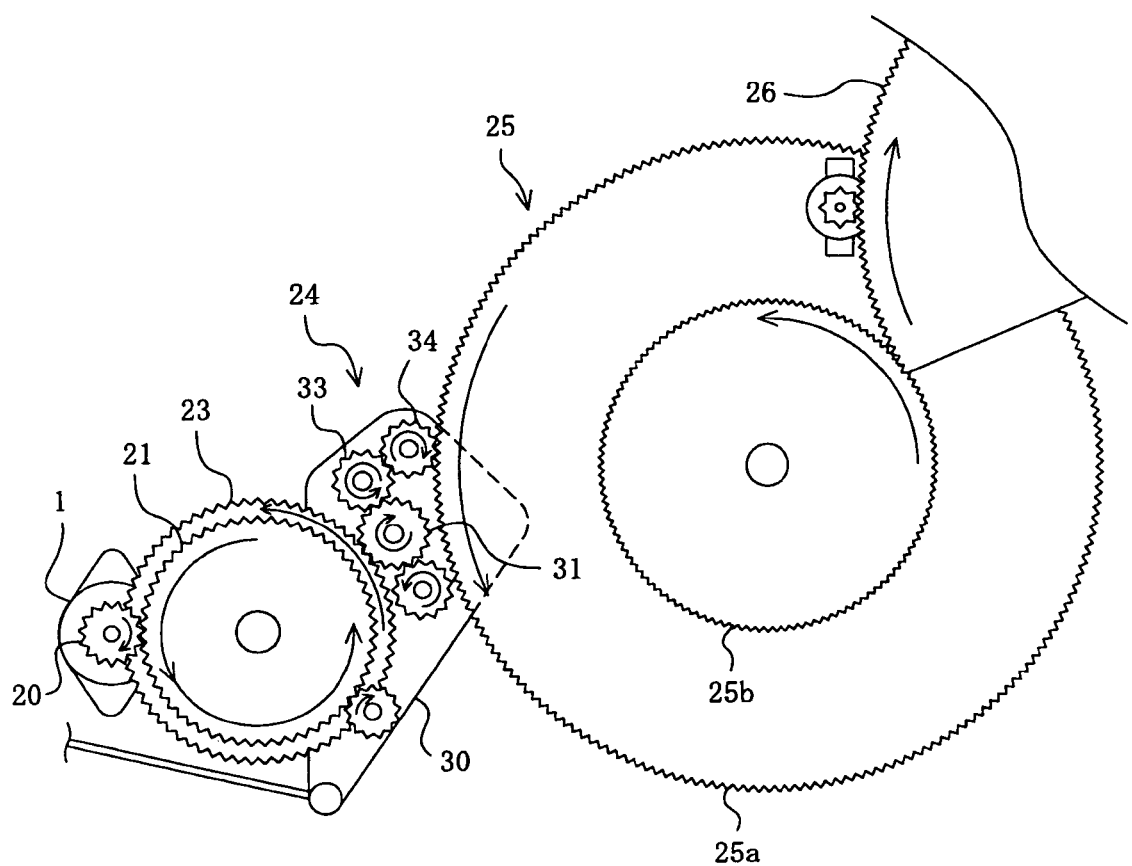
FIG. 5 is an enlarged view showing a major part of the driving apparatus of FIG. 2.

A driving apparatus according to the Example of the present invention drives a cover body of a beverage holder which is buried in a console box to be opened and closed. A functional body is the cover body of the beverage holder. Moreover, the driving apparatus according to the Example of the present invention has the configurations set forth in (1) to (4) above. FIGS. 1 and 2 and FIGS. 4 and 5 are explanatory diagrams for schematically illustrating operations of the driving apparatus according to the Example of the present invention. FIG. 3 is an enlarged exploded perspective view for schematically illustrating a major part of the driving apparatus according to the Example of the present invention. FIGS. 1 and 2 are general views for schematically illustrating the driving apparatus according to the Example of the present invention. FIGS. 4 and 5 are enlarged explanatory diagrams of a major part of the driving apparatus for showing the manner in which the functional body is driven by an urging force accumulated in a spring motor. Hereinafter, "clockwise" and "counterclockwise" indicate "clockwise" and "counterclockwise" shown in FIG. 1.

The driving apparatus according to the Example of the present invention comprises a power supply (not shown), an electric motor 1, and a driving means 2. The power supply is an accessory power supply which is turned on when an occupant starts an engine and is turned off when the occupant stops the engine. The power supply is connected to the electric motor 1. A power feed starts from the power supply to the electric motor 1 when the power supply is turned on, and the power feed stops from the power supply to the electric motor 1 when the power supply is turned off. A circuit (not shown) which connects the power supply and the electric motor 1 is provided with a timer (not shown). In other words, the timer is connected to the power supply and the electric motor 1 electrically. The timer is set to cut the connection between the power supply and the electric motor 1 when a predetermined time elapses after the power supply is turned on (after the power feed starts from the power supply to the electric motor 1). Namely, in the Example of the present invention, the timer is a cut-off means, and the time elapsed after the power feed has started is a trigger for cutting the connection between the power supply and the electric motor 1. As shown in FIG. 3, a wind-up driving gear 20 is fixed to a rotary shaft 10 of the electric motor 1.

The driving means 2 has the wind-up driving gear 20, a winding gear 21, a spring motor 22, a driving gear 23, a connecting gear member 24, a communication gear member 25, and a driven gear 26.

As shown in FIG. 3, the spring motor consists of a power spring, and is made of a long metal plate winding clockwise. The spring motor 22 is accommodated in a hollow inside formed between the winding gear 21 and the driving gear 23. The driving gear 23 is formed as a box shape. The winding gear 21 is formed as a box shape, and an inner surface of the winding gear 21 faces with an inner surface of the driving gear 23 so as to be disposed coaxially with the driving gear 23. An outer end 22a of the spring motor 22 is coupled to an inner peripheral surface of the driving gear 23. An inner end 22b of the spring motor 22 is fixed to the winding gear 21. The spring motor 22, the driving gear 23, and the winding gear 21 are of a so-called barrel drum structure. A portion on the outer end 22a of the spring motor 22 is wound reversely so as to have an S-shape. Then, the outer end 22a flexes outwardly. The outer end 22a is pressed to contact with a concave portion 23a formed on the inner peripheral surface of the driving gear 23. When the spring motor 22 is wound up, an outer shape of the spring motor 22 becomes smaller, and the pressing force of which the outer end 22a presses a surface of the concave portion 23a becomes smaller. When the spring motor 22 is wound up excessively, the pressing force of the outer end 22a becomes excessively small, and the outer end 22a slides on the surface of the concave portion 23a. Accordingly, an excessive load is not added on the spring motor 22 by winding up. The driving gear 23 and the winding gear 21 is pivotally supported on a side wall of a console box 9. The winding gear 21 meshes with a reverse inhibiting gear 27 consisting of a one-way clutch.

The winding gear 21 meshes with the wind-up driving gear 20. Therefore, the spring motor 22 and the electric motor 1 are connected by way of the wind-up driving gear 20 and the winding gear 21. As shown in FIGS. 4 and 5, when the electric motor 1 starts, the wind-up driving gear 20 rotates clockwise, and the winding gear 21 meshed with the wind-up driving gear 20 rotates counterclockwise. Consequently, the spring motor 22 in which an inner end 22b is fixed to the winding gear 21 is wound up, and an urging force is accumulated in the spring motor 22.

The functional body 90 consists of a cover body of the beverage holder 91. The functional body 90 opens and closes an opening 92 of the beverage holder 91 formed on the top surface of the console box 9. The functional body 90 is pivoted on the side wall of the console box 9, and swings relative to the console box 9. The functional body 90 swings clockwise and counterclockwise. The driven gear 26 is formed as a sector shape, and is fastened to the functional body 90. The driven gear 26 is connected to an oil damper 28.

The communication gear member 25 has a first communication gear 25a and a second communication gear 25b. The second communication gear 25b is formed to have a minor-diameter than that of the first communication gear 25a. The second communication gear 25b is fastened to a rotary shaft of the first communication gear 25a coaxially with the first communication gear 25a. The second communication gear 25b meshes with the driven gear 26.

As shown in FIG. 4, the connecting gear member 24 has a plate-shaped support plate 30, a first connecting gear 31, a second connecting gear 32, a third connecting gear 33, and a fourth connecting gear 34. The first connecting gear 31, the second connecting gear 32, the third connecting gear 33, and the fourth connecting gear 34 is pivotally supported on the support plate 30. The support plate 30 is pivoted on the side wall of the console box 9. The first connecting gear 31 meshes with the driving gear 23. The rotary shaft of the first connecting gear 31 is coaxial with the rotary shaft of the support plate 30. The second connecting gear 32 meshes with the first connecting gear 31. The third connecting gear 33 meshes with the first connecting gear 31. The fourth connecting gear 34 meshes with the third connecting gear 33. The support plate 30 swings between a reverse connecting position (as shown in FIGS. 1 and 4), in which the second connecting gear 32 meshes with the first communication gear 25a, and a proper connecting position (as shown in FIGS. 2 and 5), in which the fourth connecting gear 34 meshes with the first communication gear 25a. One of the opposite ends of a turnover spring, not shown, is fixed to the support plate 30. The other one of the opposite ends of the turnover spring is fixed to the side wall of the console box 9. Accordingly, the connecting gear member 24 is urged to the proper connecting position and the reverse connecting position. A gear group constructed by the first connecting gear 31 and the second connecting gear 32 is referred to as a first connecting gear group. A gear group constructed by the first connecting gear 31, the third connecting gear 33, and the fourth connecting gear 34 is referred to as a second connecting gear group.

As shown in FIGS. 1 and 2, a switching means 4 is connected to the connecting gear member 24. The switching means 4 has a switching body 40, a coupling member 41, a rotary member 42, and a transmitting member 43. The switching body 40 is formed as a column shape substantially. The switching body 40 is accommodated in a through hole 95 formed in a top wall of the console box 9, and a top end of the switching body 40 projects from a top surface of the console box 9. The switching body 40 is mounted with an urging means (not shown) consisting of a coil spring. The switching body 40 is urged upwardly by the urging means. Moreover, the switching body 40 is mounted with a push-locking means, not shown. The switching body 40 is locked at an on position and at an off position by the push-locking means. When the switching body 40 is placed at the off position, the top end of the switching body 40 projects greatly from the top surface of the console box 9. When the switching body 40 is placed at the on position, the projection of the switching body 40 becomes smaller.

The coupling member 41 is formed as a strip shape substantially. One of the opposite ends of the coupling member 41 is pivoted on a bottom end of the switching body 40. The rotary member 42 is formed as a disc shape. The rotary member 42 is pivoted on the side wall of the console box 9. The other one of the opposite ends of the coupling member 41 is pivoted on the rotary member 42. The transmitting member 43 is formed as a long rod shape. One of the opposite ends of the transmitting member 43 is pivoted on the rotary member 42. The other one of the opposite ends of the transmitting member 43 is pivoted on the support plate 30 of the connecting gear member 24.

When the occupant presses the switching body 40 while the switching body 40 is at the off position (as shown in FIG. 1), the switching body 40 is placed at the on position (as shown in FIG. 2). In this instance, the coupling member 41 pivoted on the switching body 40 is pressed by the switching body 40 so as to press the rotary member 42. Consequently, the rotary member 42 rotates clockwise. One of the opposite ends of the transmitting member 43 pivoted on the rotary member 42 displaces along with the rotation of the rotary member 42. Then, the transmitting member 43 pulls the support plate 30 to the left direction in FIG. 2. Therefore, the connecting gear member 24 swings clockwise and is placed at the reverse connecting position. Also, by pressing the switching means 4 again to place the switching means 4 at the off position, the connecting gear member 24 swings counterclockwise and is placed at the proper connecting position.

A first stopper (not shown) which protrudes in the direction of the driven gear 26 is formed on the side wall of the console box 9 having a pivoting shaft 94 of the functional body 90. A second stopper (not shown) which protrudes in the direction of the driven gear 26 is formed in a lower part of the first stopper on the side wall of the console box 9. The first stopper is engaged with the driven gear 26 when the functional body 90 is placed at an open position (as shown in FIGS. 2 and 4) in which the functional body 90 opens the opening 92 of the beverage holder 91. The second stopper is engaged with the driven gear 26 when the functional body 90 is placed at a close position (as shown in FIGS. 1 and 5) in which the functional body 90 closes the opening 92 of the beverage holder 91.

Hereinafter, an operation of the driving apparatus according to the Example of the present invention is described below.

When the occupant starts the engine, the power supply (the accessory power supply) is turned on. Consequently, the power feed from the power supply to the electric motor 1 starts and the electric motor 1 starts to operate. Also, in this instance, the timer starts. When the electric motor 1 starts to operate, a rotation of the electric motor 1 is transmitted to the spring motor 22 by way of the wind-up driving gear 20 and the winding gear 21, and the spring motor 22 is wound up. When the spring motor 22 is wound up, the urging force is accumulated in the spring motor 22. When the predetermined time elapses, the electrical connection between the power supply and the electric motor 1 is cut by the timer, and the electric motor 1 stops. Accordingly, the winding-up of the spring motor 22 stops.

When the urging force is accumulated in the spring motor 22, the driving gear 23 rotates counterclockwise. As shown in FIG. 1, when the connecting gear member 24 is placed at the proper connecting position, the functional body 90 is placed at the close position. In this instance, when the switching body 40 is pressed, as shown in FIG. 2, the connecting gear member 24 is placed at the reverse connecting position. Then, the driving gear 23 and the driven gear 26 are connected by the second connecting gear group and the communication gear member 25. As shown in FIG. 5, when the driving gear 23 rotates counterclockwise by the urging force of the spring motor 22, the first connecting gear 31 rotates clockwise, the third connecting gear 33 rotates counterclockwise and the fourth connecting gear 34 rotates clockwise. The first communication gear 25a which meshes with the fourth connecting gear 34 and the second communication gear 25b which is fastened to the first communication gear 25a coaxially rotate counterclockwise. Then, the driven gear 26 which meshes with the second communication gear 25b rotates clockwise and the functional body 90 which is connected to the driven gear 26 swings clockwise so as to open the opening 92 of the beverage holder 91. When the functional body 90 swings to the open position, the driven gear 26 and the first stopper are engaged so as to stop the rotation of the driven gear 26 and the swing of the functional body 90.

Note that, the winding gear 21 meshes with the reverse inhibiting gear 27. Accordingly, the winding gear 21 does not rotate clockwise. Therefore, the driving gear 23 rotates counterclockwise by the urging force of the spring motor 22.

As shown in FIG. 2, when the functional body 90 is placed at the open position and the connecting gear member 24 is placed at the reverse connecting position, by pressing the switching body 40, the connecting gear member 24 swings counterclockwise and is placed at the proper connecting position, as shown in FIG. 4. In this instance, the driving gear 23 and the driven gear 26 are connected by the first connecting gear group and the communication gear member 25. When the driving gear 23 rotates counterclockwise by the urging force of the spring motor 22, the first connecting gear 31 rotates clockwise and the second connecting gear 32 rotates counterclockwise. Accordingly, the first communication gear 25a and the second communication gear 25b rotate clockwise and the driven gear 26 rotates counterclockwise. When the driven gear 26 rotates counterclockwise, the functional body 90 swings counterclockwise and closes the opening 92 of the beverage holder 91. When the functional body 90 swings to the close position, the driven gear 26 and the second stopper are engaged so as to stop the rotation of the driven gear 26 and the swing of the functional body 90.

Note that, in either of cases in which the connecting gear member 24 is placed at the proper connecting position or the reverse connecting position, when the power supply is turned on by the occupant, the electric motor 1 starts to operate and the spring motor 22 is wound up, as shown in FIGS. 4 and 5.

In the driving apparatus according to the Example of the present invention, the urging force accumulated in the spring motor 22 drives the functional body 90. Moreover, the spring motor 22 is wound up by the electric motor 1. Accordingly, the driving apparatus according to the Example of the present invention can be produced at a low cost, and does not give excessive burdens to the occupant when the occupant opens and closes the functional body.

Note that, the driving apparatus according to the Example of the present invention winds up the spring motor 22 by the electric motor 1 only. However, it is possible to also use a means for winding up the spring motor other than the electric motor 1 in the driving apparatus according to the present invention. For example, it is possible to use an input means which operates by a necessary movement of the occupant when the occupant uses the vehicle as the means for winding up the spring motor. It is also possible to use an input means which operates depending on acceleration generated from a running motion of the vehicle as the means for winding up the spring motor.

In the present driving apparatus, a mechanism in which an urging force accumulated in the driving means 2 (the spring motor 22) drives the functional body 90 is not limited to the mechanism of the Example of the present invention.

In the driving apparatus according to the Example of the present invention, the timer is used as the cut-off means. However, for example, it is possible to use a sensor, which detects the number of rotation of the spring motor 22, as the cut-off means. In this case, the sensor as the cut-off means is electrically connected to a circuit which connects the power supply and the electric motor 1 so as to transmit a signal from the sensor. Such signal can be a trigger for cutting the connection between the power supply and the electric motor 1.

Having now fully described the present invention, it will be apparent to one of ordinary skill in the art that many changes and modifications can be made thereto without departing from the spirit or scope of the present invention as set forth herein including the appended claims.

What is claimed is:

1. A driving apparatus for driving a functional body mounted on a vehicle, comprising:
   a power supply, the power supply being turned on and off by a necessary movement of an occupant when the occupant uses the vehicle;

an electric motor connected to the power supply, started by a power feed from the power supply;

a driving means having a spring motor, being connected to the electric motor and the functional body, accumulating an urging force by winding up the spring motor by the electric motor and driving the functional body by the urging force; and a cut-off means which is connected to the power supply and the electric motor and cuts the connection between the power supply and the electric motor when the spring motor is wound up by a predetermined number of revolutions, the cut-off means being a timer which cuts the connection between the power supply and the electric motor when a predetermined period of time elapses after the power supply is turned on.

2. The driving apparatus set forth in claim 1, wherein:

the power supply is at least one power supply selected from the group consisting of an accessory power supply, an ignition power supply, an illumination power supply, a room lamp power supply, a seat-belt fastening alarm lamp power supply, and a door unlocking power supply.

* * * * *